US010970925B2

(12) United States Patent
Lang et al.

(10) Patent No.: US 10,970,925 B2
(45) Date of Patent: Apr. 6, 2021

(54) METHOD FOR CREATING A CURVED COVERING FROM FLAT MATERIAL

(71) Applicant: Biggie Inc., Thousand Oaks, CA (US)

(72) Inventors: Robert J. Lang, Alamo, CA (US); Gordon Handelsman, Thousand Oaks, CA (US)

(73) Assignee: BIGGIE INC., Thousand Oaks, CA (US)

(*) Notice: Subject to any disclaimer, the term of this patent is extended or adjusted under 35 U.S.C. 154(b) by 0 days.

(21) Appl. No.: 16/530,809

(22) Filed: Aug. 2, 2019

(65) Prior Publication Data
US 2020/0250884 A1 Aug. 6, 2020

Related U.S. Application Data (60) Provisional application No. 62/799,592, filed on Jan. 31, 2019.

(51) Int. Cl.
*G06T 17/10* (2006.01)
*G06F 30/17* (2020.01)

(52) U.S. Cl.
CPC .............. *G06T 17/10* (2013.01); *G06F 30/17* (2020.01); *G06T 2200/04* (2013.01)

(58) Field of Classification Search
CPC .................................. G06T 17/00; G06F 30/17
See application file for complete search history.

(56) References Cited

U.S. PATENT DOCUMENTS

| 3,865,382 | A | | 2/1975 | Rolf | |
|---|---|---|---|---|---|
| 4,534,813 | A | * | 8/1985 | Williamson | ....... B29O 33/3835 156/191 |
| 6,819,966 | B1 | | 11/2004 | Haeberli | |
| 8,004,517 | B1 | * | 8/2011 | Edelsbrunner | .......... G06T 17/20 345/419 |
| 8,084,117 | B2 | | 12/2011 | Lalvani | |
| 8,988,419 | B2 | * | 3/2015 | Huang | .................... G06T 19/00 345/419 |
| 2007/0064003 | A1 | | 3/2007 | Crossland | |

(Continued)

FOREIGN PATENT DOCUMENTS

CN 102880741 A 1/2013

OTHER PUBLICATIONS

Liu, Yong-Jin, Yu-Kun Lai, and Shi-Min Hu. "Developable Strip Approximation of Parametric Surfaces with Global Error Bounds." In Computer Graphics and Applications, 2007. PG'07. 15th Pacific Conference on, pp. 441-444. IEEE, 2007.
(Continued)

*Primary Examiner* — Terrell M Robinson
(74) *Attorney, Agent, or Firm* — AMPACC Law Group, PLLC (57) ABSTRACT

A method includes providing a three-dimensional representation of a doubly curved surface as a smooth function or triangulated mesh. The three-dimensional surface is cut into one or more panels representing each panel by a triangulated mesh. A two-dimensional approximation of the set of panels is created by representing the two-dimensional pattern as a triangulated mesh that is topologically equivalent to the three-dimensional meshes representing the panels.

16 Claims, 4 Drawing Sheets
(2 of 4 Drawing Sheet(s) Filed in Color)

(56) References Cited

U.S. PATENT DOCUMENTS

2010/0233421 A1* 9/2010 Lind ............... E04B 1/3211
                                                    428/108
2013/0180184 A1* 7/2013 Cheh ............... E04B 7/102
                                                    52/80.1

OTHER PUBLICATIONS

Julius, Dan Natan. "Developable surface processing methods for three-dimensional meshes." PhD diss., University of British Columbia, 2006.
Rabinovich, Michael, Tim Hoffmann, and Olga Sorkine-Hornung. "Discrete Geodesic Nets for Modeling Developable Surfaces." ACM Transactions on Graphics (TOG) 37, No. 2 (2018): 16.
Rose, Kenneth Lloyd Patrick. "Modeling developable surfaces from arbitrary boundary curves." PhD diss., University of British Columbia, 2007.
Search Report dated May 26, 2020 for PCT Application No. PCT/US2020/016176.

* cited by examiner

METHOD FOR CREATING A CURVED COVERING FROM FLAT MATERIAL

CROSS-REFERENCES TO RELATED APPLICATIONS

The present application claims benefit of U.S. Provisional Application No. 62/799,592 filed on Jan. 31, 2019, which is incorporated in its entirety herein.

BACKGROUND OF THE INVENTION

The present disclosure relates to a method for creating a curved covering from flat material, particularly mounted graphics for windows.

Mounted graphics include designs printed on substrates that can be mounted on surfaces. Mounted graphics include window graphics, which can be attached to windows, e.g., building windows, car windows, etc.

In certain applications, a window graphic displays a pattern when viewed from one side of the window, but is perceived as transparent from another side of the window. Creating a window graphic that displays an image, but also transmits light, can be accomplished by printing the image on one side of a substrate material and physically perforating the substrate material. When the perforated window graphic is attached to a window of a structure, a person inside the structure can see through the holes in the perforated substrate to the outside, thereby perceiving the window graphic as transparent.

On the other hand, a person outside the structure may see the image printed on the outside surface of the substrate of the window graphic (i.e., the material remaining after perforation), without perceiving light through the holes.

The window graphic may be physically affixed to the window surface via an adhesive. The window graphic is attached to the window surface by coating the substrate with an adhesive, and fixing the substrate to the window surface. The window graphic may also be covered with a laminate.

When the conventional window graphic is mounted on a tilted or curved mounting surface, the image and perforation pattern appears distorted from different viewpoints.

In practice, current products use a single substrate; a single perforation pattern; an additional lamination layer. In addition, conventional window graphics generally must be installed by a professional; on vertical surfaces to ensure that light transmission is not impeded; and on surfaces without wiper blades or defrost wires.

BRIEF SUMMARY OF THE INVENTION

In an embodiment, a method includes providing a three-dimensional representation of a doubly curved surface as a smooth function or triangulated mesh. The three-dimensional surface is cut into one or more panels representing each panel by a triangulated mesh. A two-dimensional approximation of the set of panels is created by representing the two-dimensional pattern as a triangulated mesh that is topologically equivalent to the three-dimensional meshes representing the panels.

In an embodiment, the method includes minimizing a strain energy in the two-dimensional panel patterns needed to make it conform to the three-dimensional doubly curved panel patterns.

In an embodiment, the method includes computing a map of the principal curvatures across the three-dimensional surface; and introducing cuts that are oriented primarily along directions of maximum principal curvature.

In an embodiment, the cuts divide the surface into separate panels, relief cuts, or a combination thereof.

In an embodiment, strain energy is minimized to determine a 2D pattern of panels that provides a best fit to the three-dimensional surface.

In another embodiment, a method includes establishing a decorative pattern; determining curvature in two directions of an object to which the pattern is to be applied; determining shapes of at least one panel of a two-dimensional sheet based on the object; printing the pattern on the two-dimensional sheet; and separating the panels from the sheet.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The present disclosure describes a method of creating a conformal covering for a doubly curved surface, such as a curved automotive windshield, from a flat material, and an apparatus that comprises one or more panel that is configured to conform to a three dimensional object that curves in at least two directions.

There is a need to create shapes that can cover curved surfaces with a second surface that closely conforms to the surface. An example of such a surface is a curved windshield, where the curved covering could be a carrier for an image to be displayed on the windshield, a sun-shield to block light from passing through the windshield, a cover to keep snow and ice off of the windshield, and other applications.

Typically such a windshield will be a curved surface, and in particular, one that is doubly curved, meaning that at any point on the curved surface, the surface curves in two orthogonal directions. A familiar example of a doubly curved surface is that of a sphere or ellipsoid, such as a football or beach ball.

Figure 1:
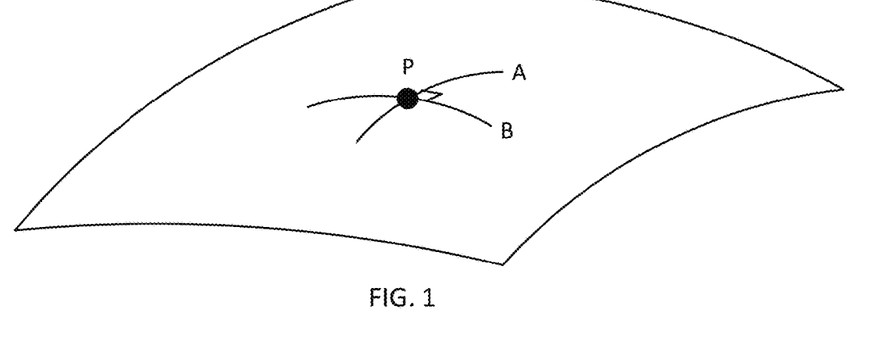
FIG. 1 illustrates a doubly curved surface according to an embodiment.

FIG. 1 illustrates a doubly curved surface according to an embodiment. At point P, the surface is curved in both the A direction and in the orthogonal B direction.

Doubly curved surfaces may be created by molding a material into a doubly curved form, or, in the case of some sports balls, by joining together flat panels, called gores, and then inflating so that the panels stretch into a doubly curved form.

A doubly curved surface may be characterized at every point on the surface by a quantity called the Gaussian curvature, which is the product of the two extremal curvature values in orthogonal directions at that point. In general, the Gaussian curvature may be positive, negative, or zero. If the surface is doubly curved at a point, then its Gaussian curvature is non-zero.

When one is making a doubly curved surface or creating a covering for a doubly curved surface, there is a strong incentive to create the covering from a material that is initially flat, for example, for ease of manufacturing (cutting from flat stock) and/or ease of printing upon the surface. Thus, there is a need for rendering a doubly curved surface, or a close approximation of same, from a material that is initially flat.

A surface that is initially flat or that can be flattened to be planar is called a developable surface. A developable surface has a Gaussian curvature of zero at every point, because even if it is curved in one direction, the curvature in the direction orthogonal to the direction of maximum curvature is zero. The Gaussian curvature is an invariant of the surface, meaning that no matter how the surface may be deformed without stretching, its Gaussian curvature is always zero at every smooth point. Because a doubly curved surface has a non-zero Gaussian curvature at every point, it is not possible to smoothly deform a developable surface to conform exactly to a doubly curved surface without stretching.

If a surface is constructed from a developable surface and the material is elastic, like leather or thin plastic, it is possible to create a doubly curved surface by sewing or joining panels that, via stretching, conform to a doubly curved surface. However, if a surface is to be constructed from a material that is inelastic and is a developable material, i.e., one that is initially flat, then it is not possible for the material to conform exactly to a doubly curved surface. It is possible, however, to create a shape from a flat, developable material that conforms closely to a doubly curved surface by creating segmented panels that individually approximate the doubly curved surface and that are joined together by folds or seams.

Figure 2:
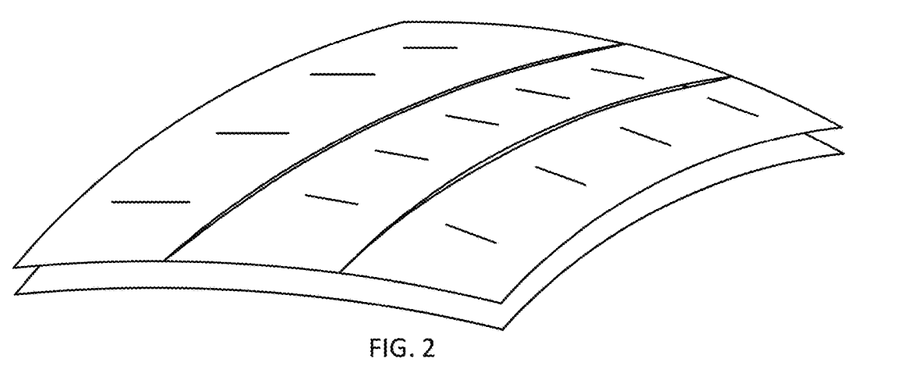
FIG. 2 illustrates approximation of a doubly curved surface by a set of developable gores according to an embodiment.

FIG. 2 illustrates approximation of a doubly curved surface by a set of developable gores according to an embodiment.

Several methods for creating approximations of curved surfaces by folding are presented in the book "Twists, Tilings, and Tessellations" (CRC Press, 2018) (henceforth, TTT) by Robert J. Lang, the present inventor, and are described mathematically. The methods are described in Chapter 10 and references therein. In all examples, the surface being approximated is rotationally symmetric and is divided up into a series of panels, or gores, that are individually developable so that they can be unfolded to be planar. The set of gores when assembled edge-to-edge constitutes an approximation of the desired doubly curved surface.

There are several ways that a set of gores could be assembled to create a covering that is an approximation of a doubly curved surface. First, the individual gores could be cut out and joined edge to edge. Typically, the edges of the gores would be either smoothly curved or a piecewise polygonal curve. The edges of the gores are then joined together to form a seam, which induces the gores to form a shape that is curved in 3D.

Figure 3:
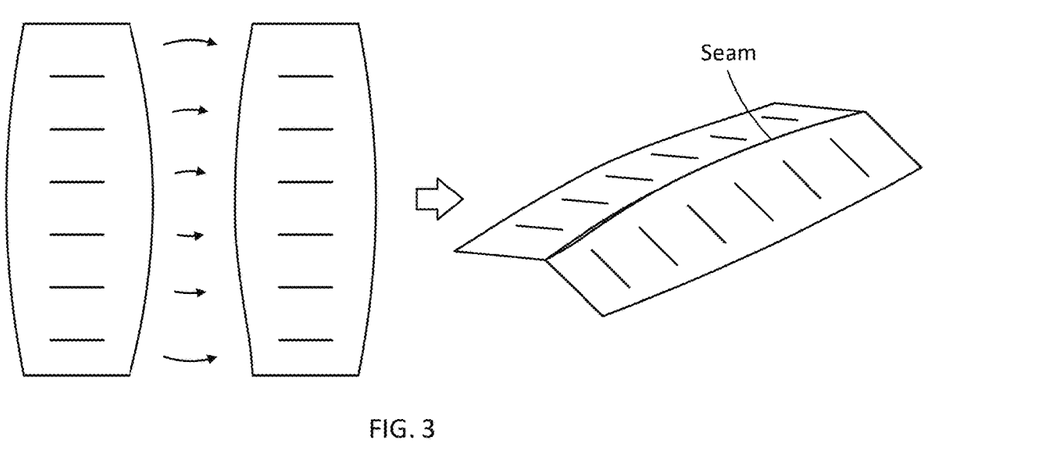
FIG. 3 illustrates two gores with curved edges that are cut out separately and then joined together according to an embodiment.

FIG. 3 illustrates two gores with curved edges that are cut out separately and then joined together according to an embodiment.

In general, the shapes of the two edges are not necessarily the same or mirror images of one another.

In addition, a resulting shape may not be a perfect fit to a doubly curved surface. However, by careful and appropriate choice of the positions and orientations of the join lines, it is possible to create a fitting surface this is sufficiently close to the doubly curved surface that it is effective for the desired end application. In some embodiments, an effective fitting surface is a surface that is substantially free of wrinkles, such that inconsistencies in fit are accommodated by elastic deformation of the fitting surface. In other embodiments, an effective fitting surface is a surface for which flaws, e.g. wrinkles, are not visible from a predetermined distance for an ordinary observer. Examples of the predetermined distance include one foot, five feet and ten feet.

A property shared by all of the examples shown in TTT and in the references cited therein is that the doubly curved surface being approximated is rotationally symmetric, i.e., there is an axis of rotational symmetry. The presence of an axis of rotational symmetry makes it relatively straightforward to compute the desired shapes of the gores that will allow them to meet edge-to-edge and realize an approximation of the doubly curved form.

However, there are shapes that are doubly curved that are not rotationally symmetric, i.e., that do not have an axis of rotational symmetry. In such cases, the methods described in TTT Chapter 10 will not provide a covering in which the edges of the individual gores meet edge-to-edge, and gores constructed according to the prescription of Chapter 10 will not provide a close approximation of the doubly curved surface.

Another property shared by all of the examples shown in TTT is that the edges of adjacent gores are mirror images of one another. This property arises naturally in rotationally symmetric shapes, but it is not required, and for a general doubly curved surface that is not rotationally symmetric, it is possible to arrive at a set of gores whose edges are not mirror-symmetric.

A process of dividing a surface up into gores according to an embodiment will now be explained with respect to FIGS. 4-6.

Figure 4:
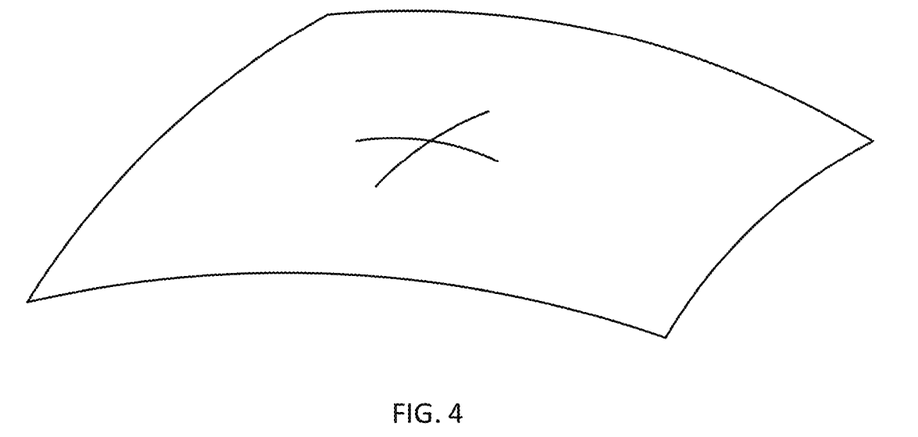
FIGS. 4-6 illustrates a process of dividing a surface up into gores according to an embodiment.

FIG. 4 illustrates a process of determining characteristics of a doubly curved surface such as the surface according to an embodiment. Determining the characteristics of the doubly curved surface may include determining an extent of curvature at all parts of the surface.

Next, a set of seam lines on the surface that divide the surface into panels that are individually still doubly curved may be determined. In the following figure, those lines are represented by the two lines that divide the rectangular shape roughly into thirds.

Figure 5:
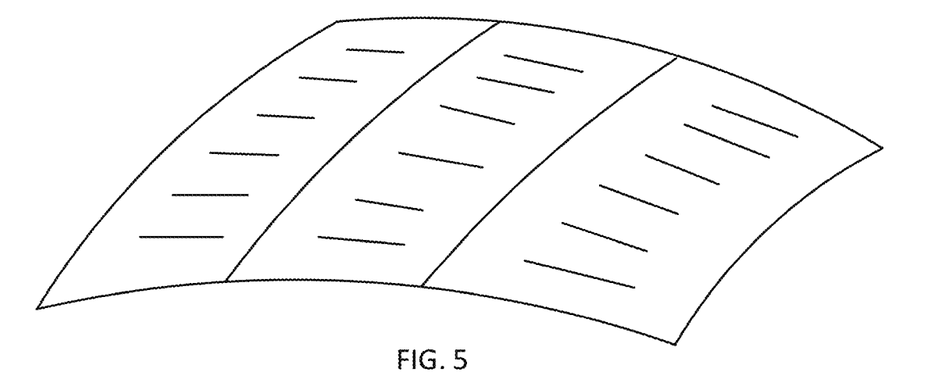

Next, opposite edges of each panel may be connected with straight lines such as the roughly horizontal lines, as illustrated in FIG. 5 according to an embodiment. A set of these straight lines defines a new surface for each panel, which is an approximation of the doubly curved surface, but is now developable; each panel may be flattened into the plane.

Figure 6:
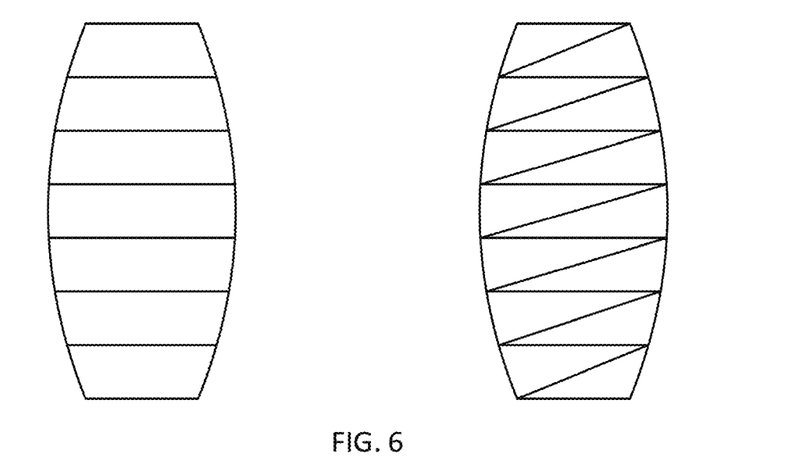

It is also possible, and may be desirable, to subdivide the panels into triangles, as illustrated in FIG. 6 according to an embodiment.

Subdividing can provide a closer approximation of the desired surface. The result is still a developable surface.

At this point, one can either join the edges of the panels directly to make a 3D form, or embed them within a flat sheet to realize an object that can be folded into the desired 3D form.

The problem of creating an approximation of a doubly curved surface from a collection of individual panels that are joined together at their edges is one that is widely known and encountered in many fields, and in particular, in the field of apparel and clothing, where clothing items such as dresses, shirts, shoes, and the like, are constructed by sewing together panels that are individually cut from a flat material, typically fabric, leather, or similar material.

To support clothing design and provide a solution to workers who wish to create such a functionality, several solutions have been constructed that take a doubly curved surface and construct a best-approximation set of panels that can be joined to realize a close approximation of the surface.

In an embodiment, a computerized model of the desired surface and is divided into one or more separate pieces. In addition, one may introduce cuts into individual pieces that do not fully separate those pieces, known as "relief cuts". The resulting model may then be processed according to an algorithm such as the examples listed above, which, for each piece, computes a flat sheet that, when conformed into three dimensions, provides an approximation of the 3D doubly curved sheet, subject to the inherent limitations of fitting a developable surface to a doubly curved sheet. Software used to provide the approximation may also provide a quantitative measurement of the fit by providing plots and worst-case values of the amount of compression or stretch needed that would provide a truly exact fit.

A general method of determining shapes of such flat pieces is to represent both the flat pieces and the target doubly curved surface as a triangulated mesh, the former in 2D, the latter in 3D. One then takes the positions of the 2D vertices as variables and solves an optimization problem that minimizes the strain energy needed to fit the 2D pattern to the 3D surface.

Thus, an embodiment of a process for creating the flat pattern may include the following:
1. Begin with a 3D representation of a doubly curved surface as a smooth function or triangulated mesh.
2. Cut the 3D surface into one or more panels, and/or introduce one or more relief cuts into the panel(s) thereby generated, representing each panel by a triangulated mesh.
3. Create a 2D approximation of the set of panels by
   a. Representing the 2D pattern as a triangulated mesh that is topologically equivalent to the 3D meshes representing the panels, and
   b. minimizing the strain energy in the 2D panel patterns needed to make it conform to the 3D doubly curved panel patterns.

An important element of this process is step 2, the cutting of the 3D surface into panels and/or the choice of relief cuts, their number, position, and orientation.

The choice of cuts—their number, position, and orientation—strongly affects the accuracy of the resulting model. For a given doubly curved surface, different choices of cuts can result in better or poorer fits to the 3D surface. It is desirable, of course, to make the choices of cuts for the best possible fit.

The maximum number of cuts may be constrained by considerations such as ease of handling. The more panels there are, the more individual pieces must be handled by a user.

Relief cuts, which do not fully divide panels, do not increase the number of pieces but do introduce points of weakness and create distinct flaps of material that can move independently, which can complicate the handling. Thus, in general, the number of cuts should be minimized, while still achieving a desired level of closeness of fit to the 3D surface. Accordingly, there is a general tradeoff between a number of cuts in a surface material and how difficult the material is to handle.

The choice of cut number, position, and orientation may be performed heuristically. Existing tools like ExactFlat do not specify positions of the cuts. They merely take the cut-up surface as defined by the user, and then produce a best-fit design subject to that cut pattern. Accordingly, embodiments include determining cut parameters including a number and direction of cuts.

For any doubly curved surface, there are two orthogonal directions along which the curvature of the surface is extremal. Those two directions are called the directions of principal curvature, and they are always orthogonal to one another.

A developable surface can be curved in one direction to perfectly fit a doubly curved surface along a line in one specific chosen direction. This line may be referred to as a fitting line. A developable surface has zero deviation from the 3D surface at every point along the fitting line, but as one moves away from the fitting line in a perpendicular direction, the developable and doubly curved surfaces diverge, with the spacing growing roughly quadratically with distance from the fitting line, and the coefficient of divergence being given by the curvature of the 3D surface transversely to the fitting line. This is because the developable surface has zero curvature (by definition) in the direction transverse to the fitting line, while the 3D surface has some nonzero curvature transverse to the fitting line (unless it, too, is a developable surface, in which case an ideal fit may be obtained in the transverse direction).

For a doubly curved surface, curvature in any direction lies inclusively between the two principal curvatures. Thus, if we want the slowest deviation from the 3D surface as we move away from the fitting line along the transverse direction, that transverse direction may optimally be the direction of the smaller of the two principal curvatures, and it is desirable to orient the fitting line to run along the direction of principal curvature.

As distance from the fitting line increases, the deviation between the developable surface and 3D surface will grow. At some point, the deviation becomes large enough that it is no longer acceptable, and the end of the 2D surface is terminated by providing a cut. The cut may be perpendicular to a direction transverse to the fitting line, which runs along the direction of maximum principal curvature.

Accordingly, in an embodiment, major cuts run along lines of maximum principal curvature of the 3D surface.

Figure 7A:
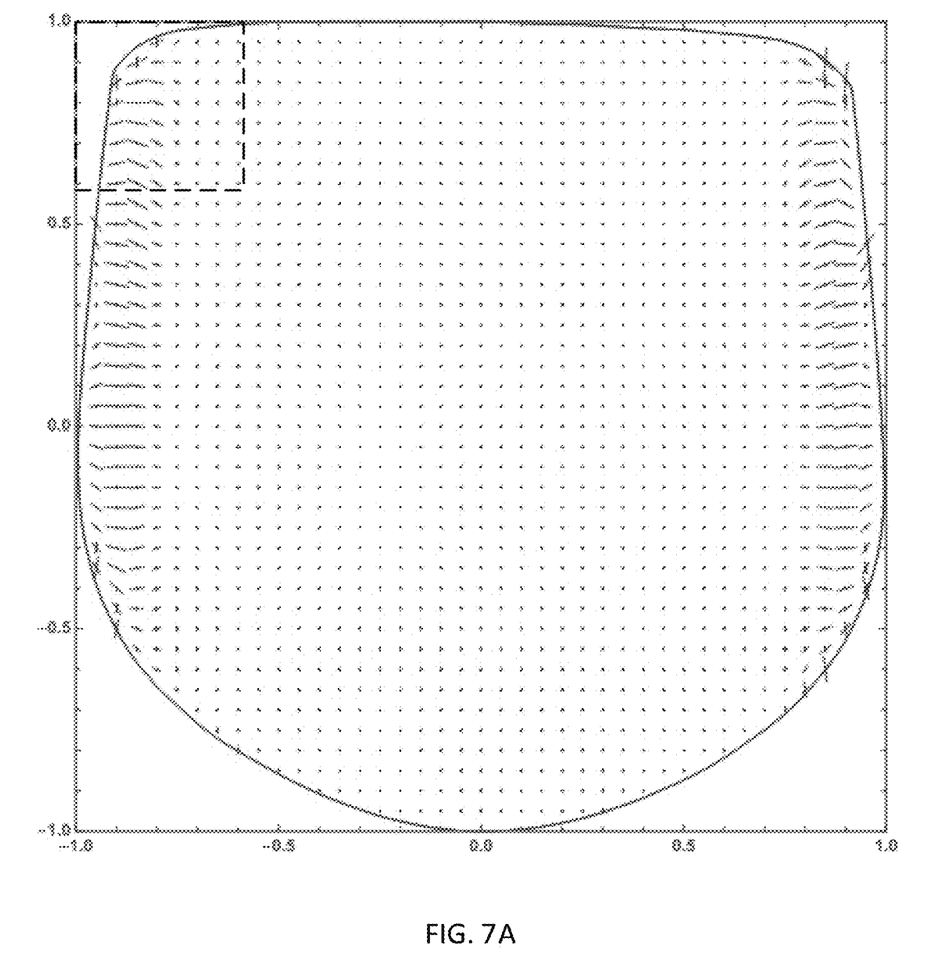
FIGS. 7A and 7B illustrate directions of principal curvature that may be determined by computing a vector field of the principal curvature directions according to an embodiment.
Figure 7B:
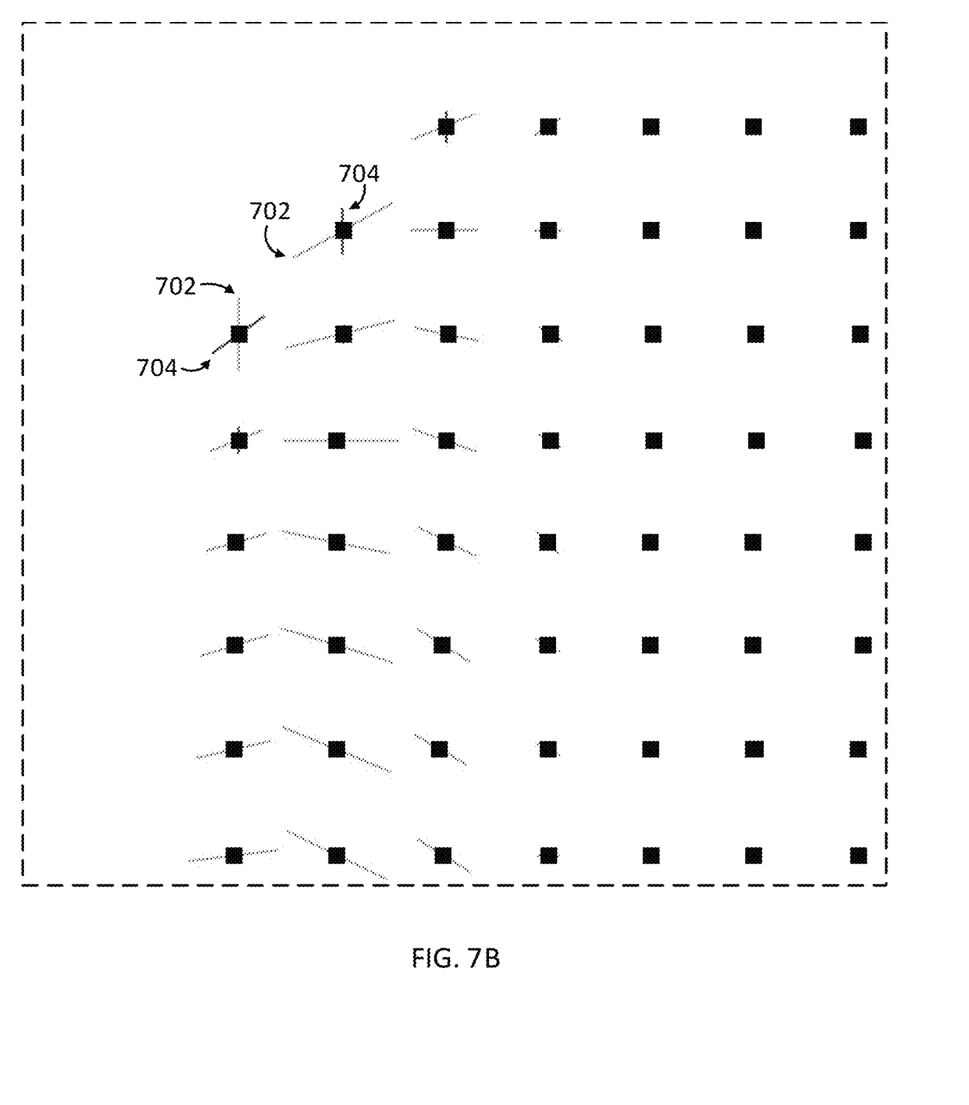

Directions of principal curvature may be determined by computing a vector field of the principal curvature directions, as illustrated in FIGS. 7A and 7B according to an embodiment.

In this plot of FIG. 7A, at each point on the surface (here, a windshield) directions and magnitudes of the principal curvatures are computed at that point. The curvatures are represented by crosses in the figure. In FIG. 7A, the larger principle curvature is a green line 702 whose length is proportional to the curvature in that direction. The smaller principal curvature is a red line 704 whose length is proportional to the curvature in that direction. In FIG. 7A, lines representing larger principle curvature are generally horizontal and occur in high density at the edges, while the crossed lines representing smaller principal curvature are generally of lesser magnitude and vertical orientations. FIG. 7A was created by distorting a rectangular object into a square plot, resulting in distortions to orthogonality of the crosses. FIG. 7B is an expanded view of the area surrounded by a broken line in FIG. 7A. FIG. 7B emphasizes the directions and magnitudes of the principal curvatures computed at each point, black square.

In the figure, over most of the windshield, both curvatures are nearly zero, which means that a flat surface provides a good fit over most of this region, which is the central region of the figure. However, near the left and right sides, the principal curvatures become appreciable, so the green lines are visibly long. Accordingly, an embodiment introduces relief cuts near the edges, and because the directions of maximum principal curvature are horizontal, the relief cuts may be horizontal as well.

In some embodiments, a pattern is present on the material, and a process may include determining sizes, shapes and locations of cuts in the material to ensure that the pattern is regular and consistent over a final three-dimensional object.

A process according to an embodiment may include computing a map of the principal curvatures across a three-dimensional object and introducing cuts that are oriented primarily along the directions of maximum principal curvature. Those cuts may be either cuts dividing the surface into separate panels, relief cuts, or a mix of the two. Strain energy may be minimized to determine a 2D pattern of panels that provides a best fit to the 3D surface An embodiment of an apparatus may include a plurality of flat panels that may have a plurality of relief cuts in the panels. The relief cuts may be oriented along directions of maximum principal curvature of the 3D surface.

In an embodiment, the term "primarily along the direction of maximum principal curvature" may be expressed as the following equation:

$$|n[\text{dot}]q| >= 0.7$$

where n is a unit vector giving the direction of a cut at any point p and q is a unit vector giving the direction of maximum principal curvature on the surface at the point closest to p.

In other words, the magnitude of the dot product between n and q is greater than or equal to 0.7.

In an embodiment, some portion of the cuts satisfy this relationship. Small deviations in angle may be provided for aesthetic or functional reasons, and/or to introduce additional cuts beyond those major cuts to provide improved fitting, and those additional cuts would then ideally be perpendicular to the major cuts. For example, deviations may be made to align a pattern disposed on the panels.

In some embodiments, the cuts may be performed automatically by a computer controlled cutting device such as a CNC laser cutter, a CNC water jet cutter, or a CNC mechanical cutting machine.

An exemplary process may comprise: establishing a decorative pattern; determining curvature in two directions of an object to which the pattern is to be applied; determining shapes of at least one panel of a two dimensional sheet based on the object; printing the pattern on the two dimensional sheet; and separating the panels from the sheet.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

What is claimed is:

1. A method, comprising:
providing a three-dimensional representation of a doubly curved surface as a smooth function or triangulated mesh;
determining a map of principal curvatures of the three-dimensional representation of the double curved surface;
cutting a flat, developable surface into a set of panels, wherein each panel of the set of panels is represented by a three-dimensional triangulated mesh;
introducing cuts to the set of panels primarily oriented along a direction of maximum principal curvature identified by the map of principal curvatures of the three-dimensional representation of the double curved surface; and
creating a two-dimensional approximation of the set of panels by representing each panel of the set of panels as a triangulated mesh that is topologically equivalent to the three-dimensional triangulated meshes that represent each of the panels.

2. The method of claim 1, wherein the cuts introduced to the set of panels include cuts that divide the set of panels separate panels or cuts that act as relief cuts for one or more panels of the set of panels.

3. The method of claim 1, wherein the cuts introduced to the set of panels are no more than a maximum number of relief cuts with respect to a desired level of fit of the developable surface to the doubly curved surface.

4. The method of claim 1, wherein a number of panels of the set of panels are no more than a maximum number of panels with respect to a desired level of fit of the developable surface to the doubly curved surface.

5. The method of claim 1, wherein the cuts are positioned on a line of the maximum principal curvature of the three-dimensional representation of the double curved surface.

6. The method of claim 1, further comprising:
introducing additional cuts to the set of panels not oriented along the direction of maximum principal curvature identified by the map of principal curvatures of the three-dimensional representation of the double curved surface.

7. A method of creating a flat covering for a doubly curved surface, the method comprising:
determining a map of principal curvatures of a three-dimensional representation of the double curved surface;
cutting a flat, developable surface into a set of panels; and
introducing cuts to one or more panels of the set of panels, wherein each of the introduced cuts are primarily oriented along a direction of maximum principal curvature identified by the map of principal curvatures of the three-dimensional representation of the double curved surface.

8. The method of claim 7, wherein the cuts are positioned on a line of the maximum principal curvature of the three-dimensional representation of the double curved surface.

9. The method of claim 7, wherein a number of introduced cuts is based on a desired level of fit of the developable surface to the doubly curved surface.

10. The method of claim 7, further comprising:
introducing additional cuts to the set of panels, wherein the additional cuts are oriented in a direction perpendicular to the direction of maximum principal curvature identified by the map of principal curvatures of the three-dimensional representation of the double curved surface.

11. The method of claim 7, further comprising:
introducing additional cuts to the set of panels,
wherein the additional cuts are oriented in a direction different from the direction of maximum principal curvature identified by the map of principal curvatures of the three-dimensional representation of the double curved surface.

12. The method of claim 7, wherein a cut is primarily oriented along the direction of maximum principal curvature when a dot product between a unit vector giving a direction of the cut and a unit vector giving the direction of the maximum principal curvature is greater than or equal to 0.7.

13. The method of claim 7, wherein the doubly curved surface is a car window, and wherein the flat covering is applied to the car window.

14. A flat covering configured to be applied to a car window, the flat covering comprising:
multiple panels that combine to form a flat, developable surface to be applied to the car window,
wherein each panel of the multiple panels includes one or more relief cuts introduced to the panel,
wherein the relief cuts are primarily oriented along a direction of maximum principal curvature identified by a map of principal curvatures of a three-dimensional representation of the car window.

15. The flat covering of claim 14, wherein at least one panel of the multiple panels includes an additional cut that is oriented in a direction perpendicular to the direction of maximum principal curvature identified by the map of principal curvatures of the three-dimensional representation of the car window.

16. The flat covering of claim 14, wherein the relief cuts are positioned on a line of the maximum principal curvature of the three-dimensional representation of the car window.

* * * * *